US005607739A

United States Patent [19]
Bartholomeusz

[11] Patent Number: 5,607,739
[45] Date of Patent: Mar. 4, 1997

[54] TEMPERATURE SENSOR AND METHOD FOR OPTICAL DISK

[75] Inventor: Brian J. Bartholomeusz, Pittsford, N.Y.

[73] Assignee: Eastman Kodak Company, Rochester, N.Y.

[21] Appl. No.: 400,165

[22] Filed: Mar. 7, 1995

[51] Int. Cl.$^6$ .................................................. B32B 3/00
[52] U.S. Cl. .................... 428/64.1; 428/64.2; 428/64.4; 428/64.8; 428/913; 430/270.1; 430/270.11; 430/270.14; 430/495.1; 430/945; 369/275.1; 369/283; 369/288
[58] Field of Search ................................ 428/64.1, 64.2, 428/64.4, 64.8, 913; 430/270, 495, 945, 270.1, 270.11, 270.14, 495.1; 369/283, 288, 275.1

[56] References Cited

U.S. PATENT DOCUMENTS

| | | | |
|---|---|---|---|
| 4,712,205 | 12/1987 | Smid et al. | 369/45 |
| 4,937,120 | 6/1990 | Hibino | 428/64.1 |
| 4,985,885 | 1/1991 | Ohta et al. | 369/275.1 |
| 5,213,859 | 5/1993 | Aoi et al. | 428/64 |
| 5,246,758 | 9/1993 | Matsui | 428/64.1 |
| 5,248,538 | 9/1993 | Kovacs et al. | 428/64 |
| 5,272,047 | 12/1993 | Kovacs et al. | 430/495 |
| 5,284,691 | 2/1994 | Taniguchi | 428/64.1 |
| 5,294,471 | 3/1994 | Evans et al. | 428/64 |

OTHER PUBLICATIONS

"Simple Predictive Models for the Thermal Response of Optical Data Storage Media", by B. Bartholomeusz, et al, Journal Applied Physics 66(10), Nov. 15, 1989, pp. 4635–4639.

"Influence of Laser Read and Bias Power Levels on the Performance of Thermomagnetooptic recording media", by B. Bartholomeusz, et al, Applied Optics, vol. 29. No. 20, Jul. 10, 1990, pp. 3030–3039.

*Primary Examiner*—Patrick Ryan
*Assistant Examiner*—Elizabeth Evans
*Attorney, Agent, or Firm*—Raymond L. Owens

[57] ABSTRACT

An optical disk is disclosed which includes a substrate and a reflector layer disposed on the substrate. At least one temperature sensitive layer disposed on the reflector layer, the sensor material being selected such that its reflectivity changes as a function of the disk temperature. Finally, a transparent overcoat over the substrate or reflector layer disposed so that incident light passes through the transparent overcoat and interacts with the temperature sensitive layer so that it provides a reflected light component, the intensity of which is temperature dependent.

4 Claims, 3 Drawing Sheets

TEMPERATURE SENSOR AND METHOD FOR OPTICAL DISK

FIELD OF THE INVENTION

The present invention relates to optical disks with an integrated temperature sensing element and also to a temperature measurement and compensation system for such disks.

BACKGROUND OF THE INVENTION

Storage devices such as optical disks and systems are required to function reliably over fairly wide temperature ranges. For example, the Philips-Sony Orange Book, Part II specifications pertaining to writable compact disk (CDR), specifies an operational range of −5 Celsius to +55 Celsius. The laser marking process is fundamentally a thermally driven phenomenon. It can, however, be augmented by other means; for example, applied magnetic fields, for Magneto-optic (MO) recording. In actual operation, the internal temperature of the recording device (drive) is often many tens of degrees Celsius above the ambient temperature. Therefore, there is a distinct possibility that at the moment of insertion of a CDR into a drive, an appreciable differential could exist between the CDR temperature and the internal drive temperature. Of course, over a period of time, the CDR temperature would equilibrate to the mean temperature within the drive. Many important procedures such as power calibration are undertaken immediately following CDR insertion when the media temperature may be closer to the external ambient temperature than to the internal drive temperature. Since this calibration is essentially a thermally based process it is very sensitive to the initial temperature of the CDR. Subsequent writing, undertaken when the disc has reached the internal temperature of the drive, is likely to be sub-optimal due to the possibility of over-powered recording conditions.

Thermocouple-based temperature sensing is perhaps the dominant, cost effective method currently used for temperature sensing applications. However, it requires a hard link to be established between the probe and measurement assemblies. Infra-red sensitive devices permit remote temperature sensing but are quite expensive and are sensitive to turbulence or thermal fluctuations in the intervening environment.

SUMMARY OF THE INVENTION

It is an object of the present invention to provide an improved optical disk which compensates for the temperature problems noted above.

It is another object of the present invention to provide an improved optical writing system which uses a disk that compensates for the temperature problems noted above.

These objects are achieved by an optical disk, the improvement comprising:

(a) a substrate;

(b) a reflector layer disposed on the substrate;

(c) at least one temperature sensitive layer disposed on the reflector layer or substrate (depending on first surface or through substrate interrogation), the temperature sensitive material being selected such that its reflectivity changes reversibly as a function of the disk temperature; and (d) a transparent protective overcoat over the substrate or the temperature sensitive layer.

Advantages

Further advantages of the present invention over current, alternative temperature sensing methods are (i) very fast response time (on the order of nanoseconds), (ii) convenience of mounting and use, (iii) very low manufacturing cost and ease of mass replication, (iv) absence of connections and cabling between sensor and probe, and (v) built-in self-calibration capabilities.

The present invention facilitates the convenient, rapid, remote sensing, and measurement of temperature. The integrated sensing element can be fabricated on an optical disc to facilitate rapid, remote temperature measurement and provide active compensation to the optimum record power which is, itself, temperature sensitive.

DETAILED DESCRIPTION OF THE PREFERRED EMBODIMENTS

Throughout the specification and claims the invention is described with reference to a CDR disk. However, it will be understood that this term is also intended to include other storage media such as MO & Phase Change based optical disks, digital optical tape, card-based media, etc.

Figure 1A:
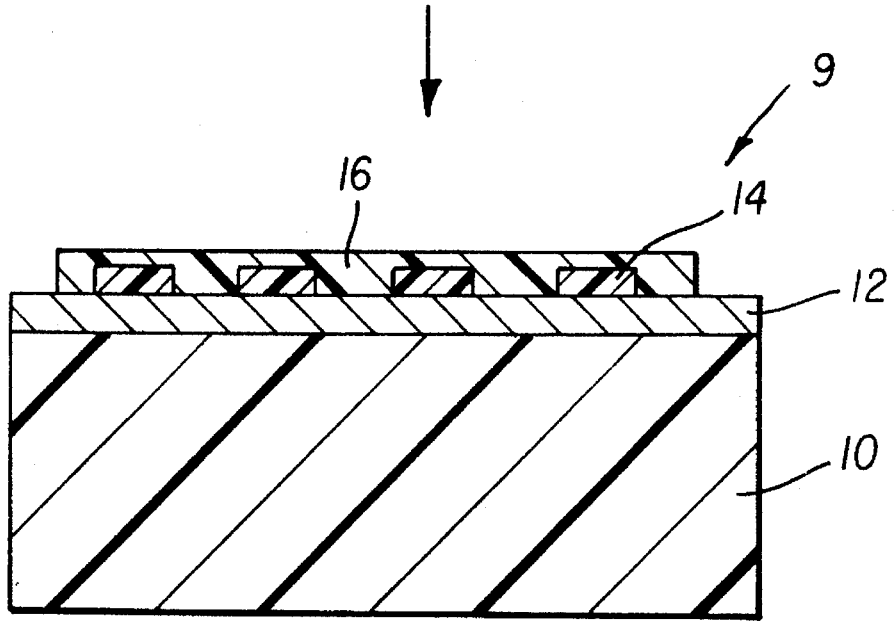
FIGS. 1A–B show in cross-section two different optical disk embodiments in accordance with the present invention.
Figure 1B:
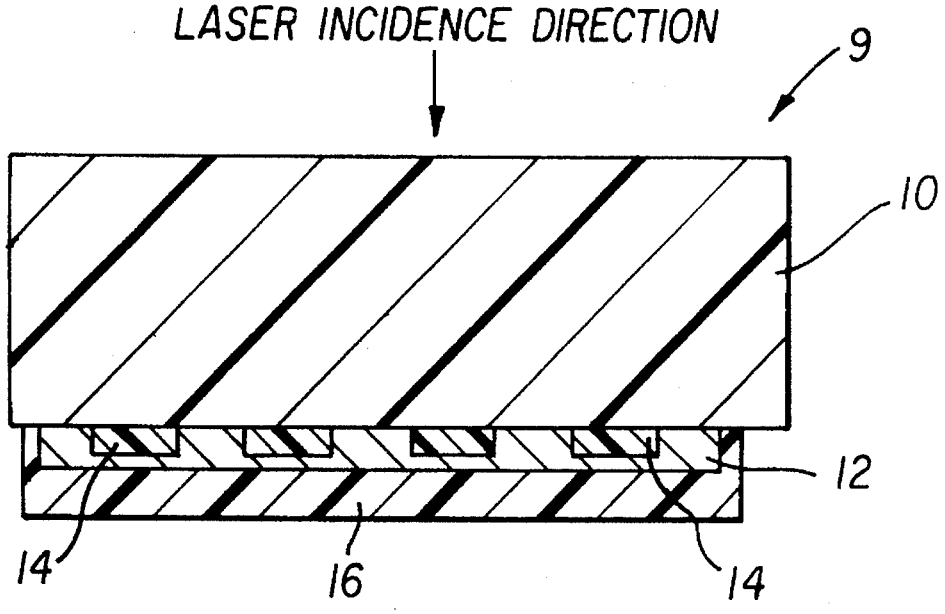

Turning now to FIGS. 1A–B, where there are shown optical disks 9 in accordance with the present invention. First we will have a generic discussion of both disks 9 and then point out the differences between them. The optical disk 9 includes a substrate made of glass or polycarbonate. A reflective layer 12 made, for example, of aluminum or gold which can be sputtered directly onto the substrate 10. At least one temperature sensitive layer 14 is deposited on the reflective layer 12. The temperature sensitive layer(s) 14 can be deposited in a conventional manner, such as by sputtering, spin-coating, evaporation, or printing. A transparent protective overcoat 16 is directly formed over the sensor layer(s) 14. The arrangement is such that incident light passes through the transparent overcoat and interacts with the sensor layer(s) so that it provides a reflected light component, the intensity of which is temperature dependent.

The substrate (10)

The substrate in FIG. 1 can be made from optically transparent resins with or without surface treatment, and for the embodiment described in FIG. 1A, can be opaque relative to write/read laser light. The preferred resins for the FIG. 1B embodiment are polycarbonates and polyacrylates. The substrate may include a guide groove for laser tracking.

Temperature sensitive (sensor) layer (14)

The temperature sensitive or sensor layer(s) in FIG. 1 includes a temperature sensitive optical material including, but not limited to, sensitizing dyes and leuco dyes. In addition, useful addenda for the sensor layer(s), may include stabilizers, surfactants, binders and diluents.

Solvent Coatings

Coating solvents for the temperature sensitive or sensor layer(s) are selected to minimize their effect on the support. Useful solvents include alcohols, ethers, hydrocarbons, hydrocarbon halides, cellosolves, ketones and water. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellusolve, ethyl cellusolve, 1-methoxy-2-propanol, methyl ethyl ketone, 4-hydroxy-4-methyl-2-pentanone, hexane, cyclohexane, ethylcyclohexane, octane, benzene, toluene, and xylene. Other less desirable solvents include dimethylsulfoxide and dimethyl formamide. Preferred solvents are hydrocarbon solvents and alcohol solvents since they have the least effect on the preferred polycarbonate substrate.

The Reflective Layer (12)

The reflective layer can be any of the metals conventionally used for optical recording materials. Useful metals can be vacuum evaporated or sputtered and include gold, silver, aluminum, copper, and alloys thereof. Gold is the preferred reflective layer material.

Binders

The binders are selected to be substantially nonabsorbtive toward the wavelengths of the write and read diode laser light.

Protective Transparent Overcoat (16)

For the embodiment described in FIG. 1A an inert, transparent, protective transparent overcoat material can be used. In FIG. 1A protective transparent overcoat material can be deposited on a reflective layer 12, whereas in FIG. 1B it is deposited on the substrate 10. In FIG. 1A light is incident through the overcoat, and in FIG. 1B light is incident through the substrate. The protective transparent overcoat material can include materials such as SiO, AlN, ZnS, or be an optically transparent resin. For the FIG. 1B embodiment it could additionally employ opaque materials including metals and resins.

Sensitizing Dye

A sensitizing dye is any dye that absorbs at a desired wavelength such as 780 nm. Preferable dyes are those which absorb strongly such that, at a concentration of $\leq 5\%$ of the recording layer in the control formulation below, the collimated beam reflectance as measured through the substrate at 780 nm after gold coating in between 50% and 90%.

Leuco dye

A leuco dye will for the purpose of this disclosure be defined as an organic reagent which absorbs at wavelengths which are shorter than when it is converted to a dye. Such a dye will absorb substantially at longer wavelengths upon thermochemical or photochemical reaction. These chemical reactions include thermally or photochemically induced changes such as oxidation, reduction, protonation, deprotonation, ring opening, metallization, condensation, dehalogenation, dehydrohalogenation, dehydration, rearrangement, polymerization, etc.

Procedure for the Identification of materials for use in temperature sensing elements A material may be identified as being useful in a temperature sensing element by coating the material in an optical disc format or on a gold coated silicon wafer (along with appropriate addenda), then using a collimated or focused laser probe beam, to examine the reversible temperature dependent reflectance and thermal stability. Alternatively, the material can be coated onto a suitable substrate and scanned in reflectance or transmission as a function of temperature for evidence of a temperature dependent absorption or reflectance spectral response.

As is well known, the optimum recording power of a CDR displays a strong dependence on the initial temperature of the medium. For example, using a simple, phenomenological model that has been shown to agree extremely well with experiment for a variety of storage materials [B. Bartholomeusz et al., J. Appl. Phys., 66(10), 4635 (1989); Appl. Optics, 29(20), 3030 (1990)] we obtain $$ORP(T_2)=ORP(T_1)-6.267\ \sigma_{\mathit{eff}}\ \delta\rho c\ V\ (T_2-T_1)/(1-R) \quad (1)$$

$T_1$, $T_2$ represent temperature, ORP is the optimum record power, $\sigma_{\mathit{eff}}$ is the irradiance radius of the focused laser used for writing, $\delta$, $\rho$, $c$, and $R$ are, respectively, the thickness, density, specific heat, and reflectance of the recording layer, V is the disc velocity (or laser scanning velocity). For a typical chalcogenide-based phase change recording medium 100 nm thick (15% reflectance) irradiated by a 1 micron diameter focused 830 nm laser spot moving at 10 m/s, this expression can be approximated to:

$$ORP(T_2)=ORP(T_1)-8.29\times10^3\ (T_2-T_1)\ (mW) \quad (2)$$

As an example let us consider that a 50 Celsius temperature differential existed between the time the power calibration was undertaken and the disc was subsequently written. The disc being cooler during the power calibration process. Using Equation (2) we estimate that the subsequent writing would be overpowered by almost 0.5 mW. This could cause a noticeable degradation in the performance of the medium compared to truly optimal writing conditions. If we are able to actively monitor disc temperature, previously established relationships such as Equation (2) could be employed to accurately compensate for any temperature fluctuations that might be experienced in the course of normal operation.

Figure 2:
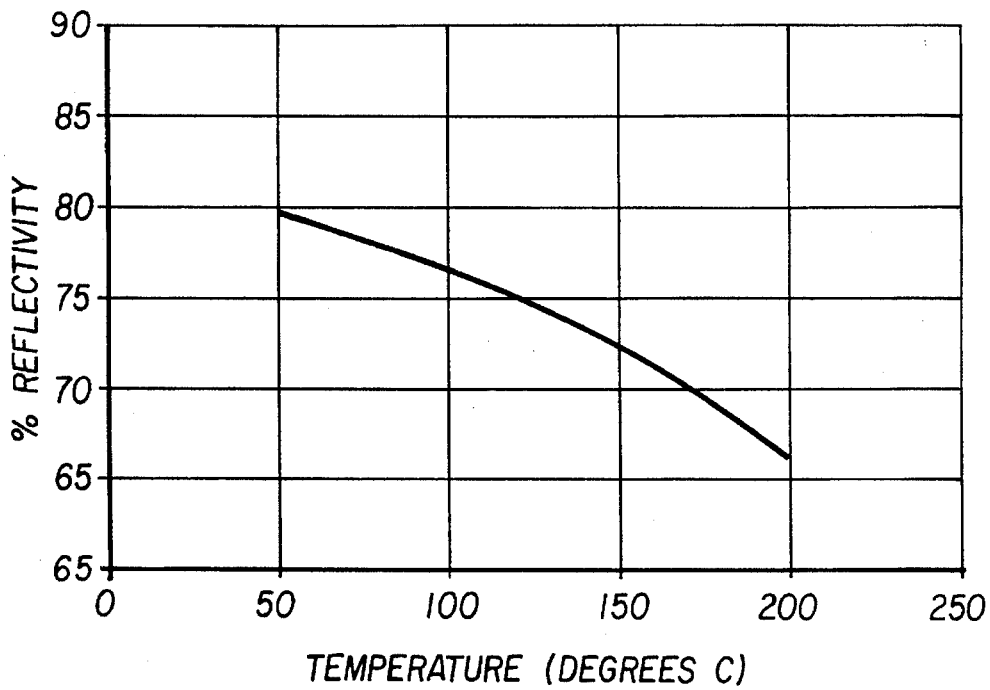
FIG. 2 depicts a curve of reflectivity vs. temperature for a temperature sensitive material in accordance with the present invention.

FIG. 2 depicts the reflectance versus temperature response of a dye chemistry employed for CDR applications. The composite curves are the result of multiple temperature cycles and display the reversible, reproducible temperature response of this class of material. From FIG. 2, we obtain the following dependence between the reflectance (at a wavelength of 800 nm) and temperature:

$$R=80.66-5.405\times10^{-3}T-3.312\times10^{-4}T^2 \quad (3)$$

Figure 3:
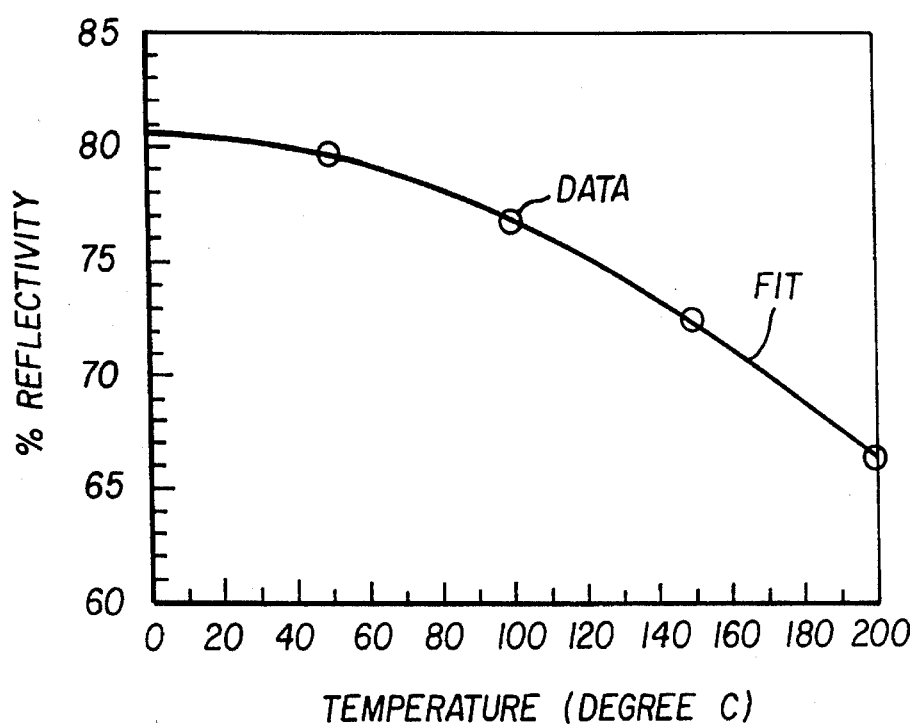
FIG. 3 is a graph showing reflectivity vs. temperature which is derived from mathematical fit of actual data.

FIG. 3 depicts the fit between the above expression and the experimentally measured dependence. It is clear that by monitoring the reflectance of the dye we can estimate temperature very accurately. For this particular example, it can be obtained by simply solving the quadratic expression using standard methods.

Dye chemistries often display a spectral temperature sensitivity. Therefore, to minimize any wavelength induced contribution to the read out reflectance (and hence temperature) it is proposed that a wavelength stabilized read out device (such as a DFB laser) be employed. To eliminate any fluctuations due to properties of the intervening environment (between sensor and read out laser) it is proposed that the sensor contain dye as well as a reflectance standard. Doing this facilitates self-calibration and standardization of the readout and greatly reduces the sensitivity of the device to variations in the angle of interrogation (incidence) of the probe laser beam as well as inhomogeneities (turbulence etc.) in the intervening space between sensor and probe.

In accordance with the present invention a temperature sensing element is incorporated on or near the recording surface of the CDR disc. This can be interrogated by either the read laser or another device such as, for example, the bar code reader implemented in Kodak CD writers. In fact, the temperature sensing element could be incorporated into the bar code itself.

Chemistries developed for the Optical Data Storage applications can display a systematic, reversible temperature dependence. For example, the optical properties of many Cyanine, Phthalo-Cyanine, Formazan, Azo, and Ether-based dyes used for optical data storage are temperature sensitive. These are described in greater detail in U.S. Pat. No. 5,248,538 issued Sep. 28, 1993 to C. A. Kovacs et al; U.S. Pat. No. 5,272,047 issued Dec. 21, 1993 to C. A. Kovacs et al; and U.S. Pat. No. 5,294,471 issued Mar. 15, 1994 to C. A. Kovacs et al and U.S. patent application Ser. No. 137,331 filed Oct. 18, 1993 by D. D. Chapman et al entitled "Metallized Azo Dianion with Two Cationic Dye Counter Ions for Optical Information Recording Medium"; Ser. No. 361,006 filed Dec. 21, 1994 by D. D. Chapman et al entitled "Metallized Azo-Ether Dyes for Optical Recording Layers"; and Ser. No. 140,646 filed Oct. 21, 1993 by D. D. Chapman et al entitled "Dye Mixtures for Optical Recording Layers". This property can be gainfully employed for a variety of applications specific to optical data storage itself as illustrated in U.S. patent application Ser. No. 297,063 filed Aug. 26, 1994 by B. J. Bartholomeusz entitled "A System and Method for High Resolution Optical Recording Using Dual Optical Sources and an Induced Shift in Media Absorption" and Ser. No. 296,560 filed Aug. 26, 1994 by B. J. Bartholomeusz entitled "A System and Method for High Resolution Optical Recording Using an Induced Shift in Media Absorption." The use of this property can be provided in an embodiment that facilitates convenient, self calibrating, remote temperature measurement of an optical disc. This would utilize pre-existing capabilities of some systems such as, for example, the bar code reader in Kodak CD writers. This also permits active temperature compensation to be incorporated in the write power circuitry and minimize the deleterious impact of disc temperature fluctuations and variations.

The present invention is also useful for remote temperature sensing purposes. Such an embodiment would include an an appropriately designed reflective element that is mounted onto the surface of some structure or device whose temperature is being monitored. The device is then interrogated by a laser beam and the temperature directly read off.

Temperature Sensing Apparatus (32)

Figure 4:
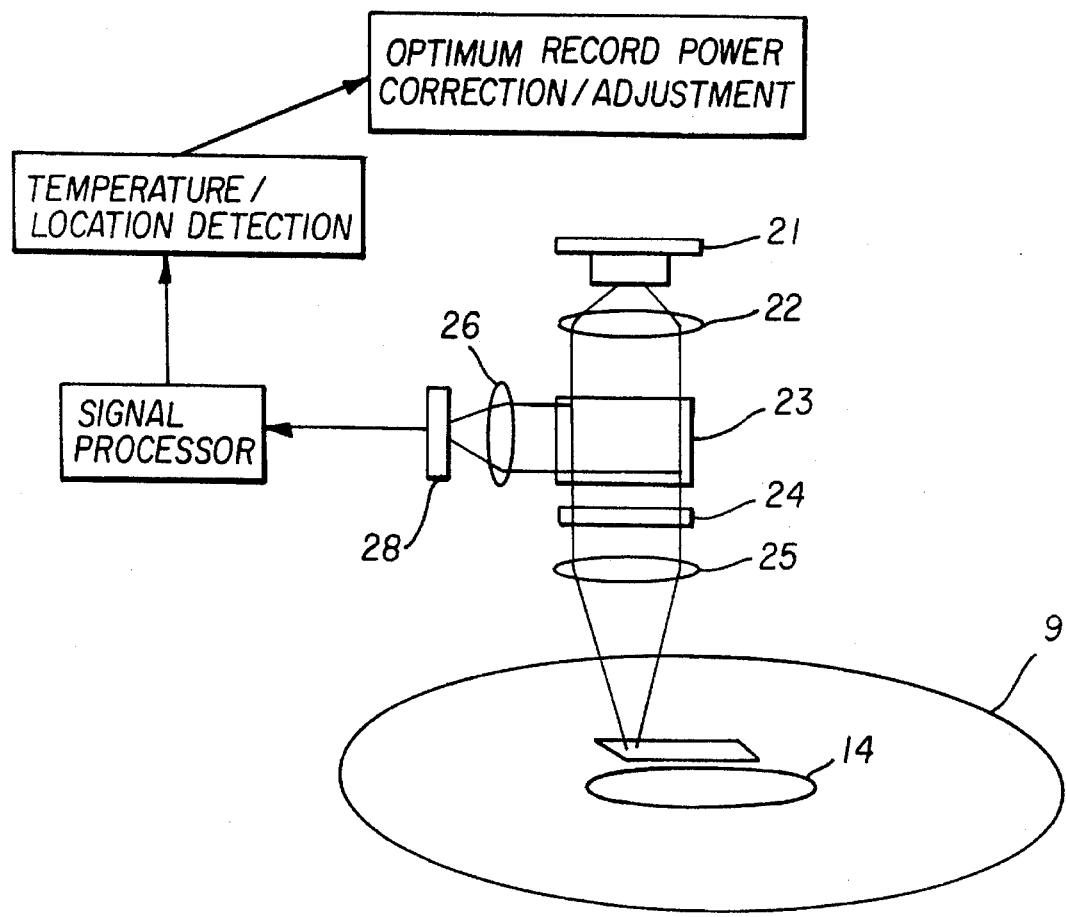
FIG. 4 shows in block diagram form a schematic of an optical reading system in accordance with the present invention which uses the disks of FIG. 1.

Referring to FIG. 4, an optical retrieval apparatus 32 which uses the optical disk 9 of FIGS. 1A or 1B on which information has been recorded is shown. A laser radiation source 21, typically a laser diode, provides a radiation beam which is collimated by collimating lens 22. The collimated radiation beam is transmitted through a polarization beam splitter 23 and applied to a quarter wave plate 24. The polarization beam splitter 23 provides linear polarization for the radiation beam and the quarter wave plate 24 provides a circular polarization to the radiation beam. The circularly polarized radiation beam form a quarter wave plate 24. Light is focused by objective lens 25 on the surface of the temperature sensitive layer 14. The interaction with the surface of the temperature sensitive layer 14 causes the radiation beam to be reflected and diffracted therefrom. The resulting radiation beam is collimated by objective lens 25 and the collimated resulting radiation beam is transmitted through the quarter wave plate 24. The quarter wave plate restores the linear polarization of the radiation beam. However, a component of the restored polarized radiation beam perpendicular to the polarization of the originally polarized beam will typically be present as a result of the second passage through the quarter wave plate 24. When the restored, polarized radiation beam is applied to the polarization beam splitter 23, the perpendicular component will be reflected by the beam splitter 23. The reflected radiation beam is applied to a sensor focusing lens 26 which converges the resulting radiation beam on sensor array 28. The resulting radiation beam has imposed thereon modulation from the reflectance variation in the temperature sensing element that can be processed to provide information on the temperature of the disk surface and any other information stored in the temperature sensitive element 14. In addition, the resulting radiation beam can be processed in such a manner as to provide tracking and focusing signals which controls the position of the focused radiation beam on the surface of the temperature sensitive layer 14 (i.e., the tracking in one dimension) and which controls the distance of the objective lens 25 from the surface of the temperature sensitive layer 14, (i.e., the focusing of the radiation beam on the surface of the temperature sensitive layer 14. See, for example, published European Patent Application 0,177,108 A1, issued in the name of A. Smid, P. F. Grave, and H. 't Lam, entitled "Opto-Electronic Focusing-Error Detection System, and filed on Feb. 10, 1985. In this retrieval apparatus, the quarter wave plate imparts, to the radiation beam illuminating the surface of the temperature sensitive layer 14, a circular polarization. After reflection from the surface of the temperature sensitive layer 14, the quarter wave plate restores a linear polarization. However, the linearly polarized radiation beam will have a component which is rotated by an angle of 90° from the plane of polarization originally established by the polarization beam splitter 23. The rotated component of the radiation resulting from interaction with the surface of the temperature sensitive layer 14 is reflected by the beam splitter 23 and applied to a sensor array 28. The sensor array 28 produces usable electrical signals having information content corresponding to the patterned temperature sensing element.

Figure 5:
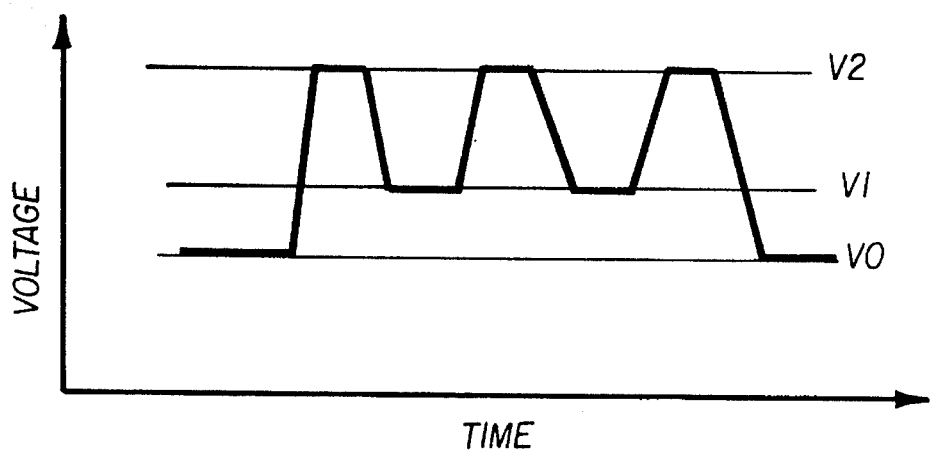
FIG. 5 is a plot of voltage vs. time for the signals at the output of the photodetector shown in FIG. 4.

FIG. 5 depicts the output signals we would expect from the configurations depicted in FIG. 2 and also the conversion between detected signals and sample temperature. The specific conversion to temperature is simply accomplished through an equation such as (3) above. Operation of the device would be analogous to that of a bar-code scanner. The voltages $V_0$, $V_1$, and $V_2$ provide a self-calibrating measure of disk temperature which can be used to adjust write laser power to an optimum level.

For example, the present invention can be advantageously applied in measuring the temperature at specific locations on moving objects. This invention provides a much higher degree of spatial and temporal resolution than would, say, conventional methods and additionally, permits convenient multiplexing. Moreover, multiple sensors could be mounted at various strategic locations on a large piece of equipment or machinery and be remotely monitored by a single laser probe device on a continual basis. This would be particularly advantageous if the equipment or object being monitored is located in an environment subject to appreciable thermal fluctuations and air turbulence that affect the accuracy and operation of infra-red sensing devices.

The invention has been described in detail with particular reference to certain preferred embodiments thereof, but it will be understood that variations and modifications can be effected within the spirit and scope of the invention.

PARTS LIST 9 optical disks
10 substrate
12 reflective layer 14 temperature sensitive layer
16 transparent protective overcoat

I claim:

1. In an optical recording system for writing on an optical disk including means for providing an optical write beam at a selected intensity and frequency, the improvement comprising:
   (a) the disk including:
      (i) a substrate;
      (ii) a reflector layer disposed on the substrate;
      (iii) at least one temperature sensitive recording layer disposed on the reflector layer, the temperature sensitive recording layer being selected such that its reflectivity reversibly changes as a function of the disk temperature; and
      (iv) a transparent overcoat over the substrate or reflector layer; and
   (b) the system including:
      (i) means for projecting a beam of light to be incident upon the temperature sensitive recording layer;
      (ii) means for receiving temperature dependent reflected light from the temperature sensitive recording layer and providing an electrical signal which is a function of the reflectivity of the light beam;
      (iii) temperature correction means, responsive to the electrical signal, for generating a temperature correction signal; and
      (iv) means for changing the intensity of the write beam in response to the temperature correction signal.

2. The optical disk of claim 1 wherein the transparent overcoat is disposed so that incident light passes through the transparent overcoat and interacts with the temperature sensitive recording layer so that it provides a reflected light component, the intensity of which is temperature dependent.

3. The optical disk of claim 1 wherein the transparent overcoat is disposed so that incident light passes through the substrate and interacts with the temperature sensitive recording layer so that it provides a reflected light component, the intensity of which is temperature dependent.

4. An optical reading system as claimed in claim 1, wherein the temperature sensitive recording layer of said disk is formed into a plurality of sensor strips.

* * * * *